(12) United States Patent
Santra et al.

(10) Patent No.: US 11,767,466 B2
(45) Date of Patent: Sep. 26, 2023

(54) NANOCOMPOSITE COATED PROPPANTS AND METHODS OF MAKING SAME

(71) Applicant: Saudi Arabian Oil Company, Dhahran (SA)

(72) Inventors: Ashok Santra, The Woodlands, TX (US); Peter J. Boul, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 556 days.

(21) Appl. No.: 16/832,297

(22) Filed: Mar. 27, 2020

(65) Prior Publication Data

US 2020/0332179 A1    Oct. 22, 2020

Related U.S. Application Data

(60) Provisional application No. 62/835,124, filed on Apr. 17, 2019.

(51) Int. Cl.
*C09K 8/80* (2006.01)
*C01B 32/162* (2017.01)
(Continued)

(52) U.S. Cl.
CPC ............ *C09K 8/805* (2013.01); *C01B 32/162* (2017.08); *C01B 32/174* (2017.08); *B82Y 30/00* (2013.01);
(Continued)

(58) Field of Classification Search
CPC ................ C09K 8/805; C09K 2208/10; Y10T 428/2991
See application file for complete search history.

(56) References Cited

U.S. PATENT DOCUMENTS

| 4,663,230 A | 5/1987 | Tennett |
| 6,177,396 B1 | 1/2001 | Clapperton et al. |

(Continued)

FOREIGN PATENT DOCUMENTS

| CN | 101768431 A | 7/2010 |
| CN | 105016322 A | 11/2015 |

(Continued)

OTHER PUBLICATIONS

International Search Report and Written Opinion dated Jul. 1, 2020 pertaining to International application No. PCT/US2020/026103 filed Apr. 1, 2020, 18 pgs.

(Continued)

*Primary Examiner* — Hoa (Holly) Le
(74) *Attorney, Agent, or Firm* — DINSMORE & SHOHL LLP

(57) ABSTRACT

The present disclosure relates to methods of making nanocomposite coated proppants with a nanocomposite coating, including adding a quantity of precursor nanoparticles comprising carbon nanotubes supported by metal oxide catalyst nanoparticles to an uncured resin. The metal oxide catalyst nanoparticles and the uncured resin are selected such that the metal oxide catalyst nanoparticles are dissolvable in the uncured resin. The metal oxide catalyst nanoparticles are capable of dissolving in the uncured resin such that an amount of carbon nanotubes are dispersed within the uncured resin to form a nanocomposite coating. The method may further include coating proppant particles with the nanocomposite coating to make nanocomposite coated proppants.

20 Claims, 2 Drawing Sheets

(51) Int. Cl.
*C01B 32/174* (2017.01)
*B82Y 30/00* (2011.01)
*B82Y 40/00* (2011.01)

(52) U.S. Cl.
CPC ........... *B82Y 40/00* (2013.01); *C01B 2202/36* (2013.01); *C09K 2208/10* (2013.01); *Y10T 428/2991* (2015.01)

(56) References Cited

U.S. PATENT DOCUMENTS

| | | | |
|---|---|---|---|
| 6,787,505 | B1 | 9/2004 | Maitland et al. |
| 6,900,580 | B2 | 5/2005 | Dai et al. |
| 7,799,246 | B2 | 9/2010 | Bordere et al. |
| 7,968,184 | B2 | 6/2011 | Humphreys et al. |
| 8,075,799 | B2 | 12/2011 | Hong et al. |
| 8,469,118 | B2 | 6/2013 | Passade-Boupat et al. |
| 8,763,695 | B2 | 7/2014 | van Zanten |
| 8,790,615 | B2 | 7/2014 | Viswanathan |
| 9,777,132 | B2 | 10/2017 | Kverel et al. |
| 9,987,608 | B2 | 6/2018 | Pigos |
| 10,190,370 | B1 | 1/2019 | Taha et al. |
| 11,377,944 | B2* | 7/2022 | Santra ................. C09K 8/68 |
| 2006/0078489 | A1 | 4/2006 | Harutyunyan et al. |
| 2006/0104889 | A1 | 5/2006 | Harutyunyan et al. |
| 2006/0177659 | A1 | 8/2006 | Chen et al. |
| 2007/0140951 | A1 | 6/2007 | O'Brien et al. |
| 2010/0105834 | A1 | 4/2010 | Tour et al. |
| 2010/0224129 | A1 | 9/2010 | Malecki et al. |
| 2010/0239489 | A1 | 9/2010 | Harutyunyan et al. |
| 2010/0243236 | A1 | 9/2010 | Koons |
| 2010/0300759 | A1* | 12/2010 | Passade-Boupat ...... C09K 8/32 977/902 |
| 2011/0011157 | A1 | 1/2011 | Bourlon et al. |
| 2011/0060162 | A1 | 3/2011 | Tatsuhara et al. |
| 2011/0089958 | A1 | 4/2011 | Malecki et al. |
| 2011/0107942 | A1 | 5/2011 | Eleto Da Silva et al. |
| 2011/0254553 | A1 | 10/2011 | van Zanten |
| 2012/0015852 | A1 | 1/2012 | Quintero et al. |
| 2012/0018155 | A1 | 1/2012 | Patil et al. |
| 2012/0042806 | A1 | 2/2012 | Hersam et al. |
| 2012/0181019 | A1* | 7/2012 | Saini ..................... C09K 8/516 166/305.1 |
| 2013/0213638 | A1 | 8/2013 | Keller et al. |
| 2013/0217603 | A1 | 8/2013 | Jamison et al. |
| 2014/0096964 | A1 | 4/2014 | Chakraborty et al. |
| 2014/0367091 | A1 | 12/2014 | Tour et al. |
| 2015/0153472 | A1 | 6/2015 | Tour et al. |
| 2015/0284619 | A1 | 10/2015 | Price Hoelscher et al. |
| 2016/0017202 | A1 | 1/2016 | Yang et al. |
| 2016/0258269 | A1 | 9/2016 | Musso et al. |
| 2016/0333258 | A1* | 11/2016 | Drake .................. E21B 43/267 |
| 2017/0327729 | A1 | 11/2017 | Salla et al. |
| 2018/0306027 | A1 | 10/2018 | Sherman et al. |
| 2021/0115314 | A1* | 4/2021 | Boul ..................... E21B 21/08 |

FOREIGN PATENT DOCUMENTS

| | | |
|---|---|---|
| CN | 104962276 B | 3/2019 |
| GB | 2520018 A | 5/2015 |
| JP | 03174341 A | 7/1991 |
| RU | 2015129136 A | 1/2017 |
| WO | 03004155 A1 | 1/2003 |
| WO | 2006137942 A2 | 12/2006 |
| WO | 2007093725 A2 | 8/2007 |
| WO | 2011128615 A1 | 10/2011 |
| WO | 2012085516 A2 | 6/2012 |
| WO | 2012114068 A2 | 8/2012 |
| WO | 2013008209 A2 | 1/2013 |
| WO | 2014060686 A1 | 4/2014 |
| WO | 2015038117 A1 | 3/2015 |
| WO | 2015077524 A1 | 5/2015 |
| WO | 2017152298 A1 | 9/2017 |
| WO | 2018048569 A1 | 3/2018 |
| WO | 2018101545 A1 | 6/2018 |

OTHER PUBLICATIONS

International Search Report and Written Opinion dated Jul. 1, 2020 pertaining to International application No. PCT/US2020/026871 filed Apr. 6, 2020, 18 pgs.

International Search Report and Written Opinion dated Jul. 10, 2020 pertaining to International application No. PCT/US2020/024917 filed Mar. 26, 2020, 13 pgs.

International Search Report and Written Opinion dated Jul. 16, 2020 pertaining to International application No. PCT/US2020/028077 filed Apr. 14, 2020, 17 pgs.

Gomez et al., "Proppant immobilization facilitated by carbon nanotube mediated microwave treatment of polymer-proppant structures" Colloids and Surfaces A: Physiochemical and Engineering Aspects, Elsevier, Amsterdam, NL, vol. 513, Oct. 27, 2016, pp. 297-305.

Orbaek, Alvin W. et al., "The development of a 'process map' for the growth of carbon nanomaterials from ferrocene by injection CVD" Journal of Materials Chemistry A, vol. 1, No. 25, Jan. 1, 2013, p. 14122.

Gomez et al. "Enhanced purification of carbon nanotubes by microwave and chlorine cleaning procedures" RSC Advances, vol. 6, No. 14, Jan. 1, 2016, pp. 11895-11902.

Eftekhari et al., "High-yield synthesis of carbon nanotubes using a water-soluble catalyst support in catalytic chemical vapor deposition" Carbon, Elsevier, Oxford, GB, vol. 44, No. 7, Jun. 1, 2006, pp. 1343-1345.

Al-Rekabi, "Use of Carbon Nanofilaments in Producing Cementitious Composites with Improved Mechanical and Durability Performance", Thesis submitted Sep. 2017.

Azhari et al., "Cement-based sensors with carbon fibers and carbon nanotubes for piezoresistive sensing", Cement & Concrete Composites, vol. 34, pp. 866-873, 2012.

Cervantes-Sodi et al., "Selective synthesis of double helices of carbon nanotube bundles grown on treated metallic substrates", Physics Status Solidi (b), vol. 249, No. 12, pp. 2382-2385, 2012.

Cwirzen et al., "CHH Cement Composite", Cement & Concrete Research, Jan. 2009.

D'Alessandro et al., "Self-sensing and thermal energy experimental characterization of multifunctional cement-matrix composites with carbon nano-inclusions", Behavior and Mechanics of Multifunctional Materials and Composites Proceedings vol. 9800, 2016.

D'Alessandro et al., "Static Dynamic Strain Monitoring of Reinforced Concrete Components through Embedded Carbon Nanotube Cement-Based Sensors", Hindawi, Shock and Vibration, vol. 2017, Article ID 3648403, 11 pages, Aug. 7, 2017.

Falikman et al., "Nanotechnologies in New Structural Concretes: Practice and Outlook", Concrete, Innovation and Desibn, fib Symposium, Cophenhagen, May 18-20, 2015.

Khalil et al., "Advanced nanomaterials in oil and gas industry: Design, application and challenges", Applied Energy 191, pp. 287-310, 2017.

Lamesh, et al., "Effect of the Support on Structure of the Multi-Walled Carbon Nanotubes Grown by CCVD over Nickel Nanoparticles", Journal of Advances in Nanomaterials, vol. 2, No. 3, Sep. 2017.

Mangadlao et al., "Smart cements and cement additives for oil and gas operations", Journal of Petroleum Science and Engineering, vol. 129, pp. 63-76, 2015.

Ning, et al., "Improvement of Fe/MgO Catalysts by Calcination for the Growth of Single- and Double-Walled Carbon Nanotubes", J. Phys. Chem., vol. 110, No. 3, pp. 1201-1205, 2006.

Sanchez et al., "Nanotechnology in concrete—A review", Construction and Building Materials, vol. 24, pp. 2060-2071, 2010.

Tragazikis et al., "Acoustic emission investigation of the mechanical performance of carbon nanotube-modified cement-based mortars", Construction and Building Materials, vol. 122, pp. 518-524, 2016.

Ubertini et al., Natural Frequencies Identification of a Reinforced Concrete Beam using Carbon Nanobube Cement-based Sensors, Engineering Structures, vol. 60, pp. 265-275, Feb. 2014.

Zolotarev et al., "Impact Resistance of Cement and Gypsum Plaster Nanomodified by Water-Soluble Fullerenols",Industrial & Engineering Chemistry Research, vol. 52, pp. 14583-14591, 2013.

(56) References Cited

OTHER PUBLICATIONS

U.S. Office Action dated Nov. 10, 2021 pertaining to U.S. Appl. No. 16/934,637, filed Jul. 21, 2020, 35 pages.
Nasibulin, A.G. et al. "A novel cement-based hybrid material" New Journal of Physics, 11 (2009), 023013, pp. 1-12.
Chang, L. W. et al. "Magnetic Properties of Multi-Walled Carbon Nanotubes" Journal of Nanoscience and Nanotechnology, vol. 9(3), pp. 1956-1963, 2009.
Office Action dated Jun. 30, 2021 pertaining to U.S. Appl. No. 16/832,250, filed Mar. 27, 2020, 31 pages.
U.S. Office Action dated Sep. 23, 2021 pertaining to U.S. Appl. No. 16/832,218, filed Mar. 27, 2020, 24 pages.
International Search Report and Written Opinion dated Nov. 5, 2020 pertaining to International application No. PCT/US2020/043219 filed Jul. 23, 2020, 13 pgs.
U.S. Office Action dated Oct. 14, 2021 pertaining to U.S. Appl. No. 16/832,279, filed Mar. 27, 2020, 42 pages.
U.S. Notice of Allowance and Fee(s) Due dated Oct. 20, 2021 pertaining to U.S. Appl. No. 16/832,250, filed Mar. 27, 2020, 15 pages.
U.S. Notice of Allowance and Fee(s) Due dated Mar. 14, 2022 pertaining to U.S. Appl. No. 16/832,218, filed Mar. 27, 2020, 9 pages.
Office action with English translation, dated Oct. 10, 2022 in related Chinese Patent Application No. 202080035358.1, filed Apr. 14, 2020.

* cited by examiner

NANOCOMPOSITE COATED PROPPANTS AND METHODS OF MAKING SAME

CROSS-REFERENCE TO RELATED APPLICATIONS

This application claims priority to U.S. Provisional Application No. 62/835,124, filed Apr. 17, 2019, which is incorporated by reference in its entirety.

TECHNICAL FIELD

Embodiments of the present disclosure generally relate to coated proppant systems, their method of manufacture, and their method of use.

BACKGROUND

Hydraulic fracturing is a stimulation treatment routinely performed on oil and gas wells. Hydraulic fracturing fluids are pumped into the subsurface formation to be treated, causing fractures to open in the subsurface formation. Proppants, such as grains of sand, may be mixed with the treatment fluid to keep the fracture open when the treatment is complete.

SUMMARY

It is often desirable during and after fracturing a subsurface formation to hold the fractures open through the use of proppants for more effective oil and gas production than without. However, sand particles, which are used as a proppants, may not provide sufficient crush resistance for use in a given subsurface formation due to the polycrystalline nature of the grains. Conventional proppants, such as sand, can break under downhole stresses due to the core material being inherently insufficient to withstand the crush stress induced by the formation. Ceramic proppants break down in wet conditions, which may cause them to lose their crush resistance. Temperatures downhole exacerbate this effect. Proppant coatings are used to protect the proppant particle from degradation by the presence of aqueous fluids at downhole temperatures. The coating also helps to distribute the stresses on a larger surface area of proppant thereby increasing the crush strength of the coated particles. The proppant coating also adheres to the proppant and prevents proppant that is crushed upon application of formation stress from releasing proppant fines. The fines may migrate into the formation and restrict flow conductivity of the formation. However, polymeric coatings without any reinforcing agents tend to have lesser mechanical strength than is desired and deteriorate at downhole temperatures in the presence of fluid. This weakening of the coating structure causes the proppant to degrade and generate fines when the closure stress, which is the pressure at which a fracture closes, is applied to the coated proppant. This may plug the fracture and reduce permeability.

Accordingly, a need exists for a strong, chemically resistant proppant coating to improve proppant performance. Using resin in a proppant coating prevents crushing, fines migration, proppant flowback and breakdown of the proppant particle. The dispersion of nanoscale reinforcing agents throughout the proppant coating enhances the mechanical strength of the coating materials and provides resistance to the chemicals present in hydraulic fracturing fluid. Nanoscale reinforcing agents may include as carbon nanotubes such as single wall carbon nanotubes, multi-walled carbon nanotubes, and silicon carbide nanotubes, According to some embodiments of the present disclosure, a method of making nanocomposite coated proppants with a nanocomposite coating may include adding a quantity of precursor nanoparticles including carbon nanotubes supported by metal oxide catalyst nanoparticles to an uncured resin. The metal oxide catalyst nanoparticles and the uncured resin may be selected such that the metal oxide catalyst nanoparticles are dissolvable in the uncured resin. The metal oxide catalyst nanoparticles are operable to dissolve in the uncured resin, which results in an amount of carbon nanotubes dispersed within the uncured resin. The amount of carbon nanotubes dispersed within the uncured resin form the nanocomposite coating. The method may further include coating proppant particles with the nanocomposite coating to make the nanocomposite coated proppants.

According to some embodiments of the present disclosure, a nanocomposite coated proppant may include a proppant particle and a nanocomposite coating. The nanocomposite coating may coat the surface of the proppant particle. The nanocomposite coating may include a cured resin and a quantity of dispersed carbon nanotubes.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
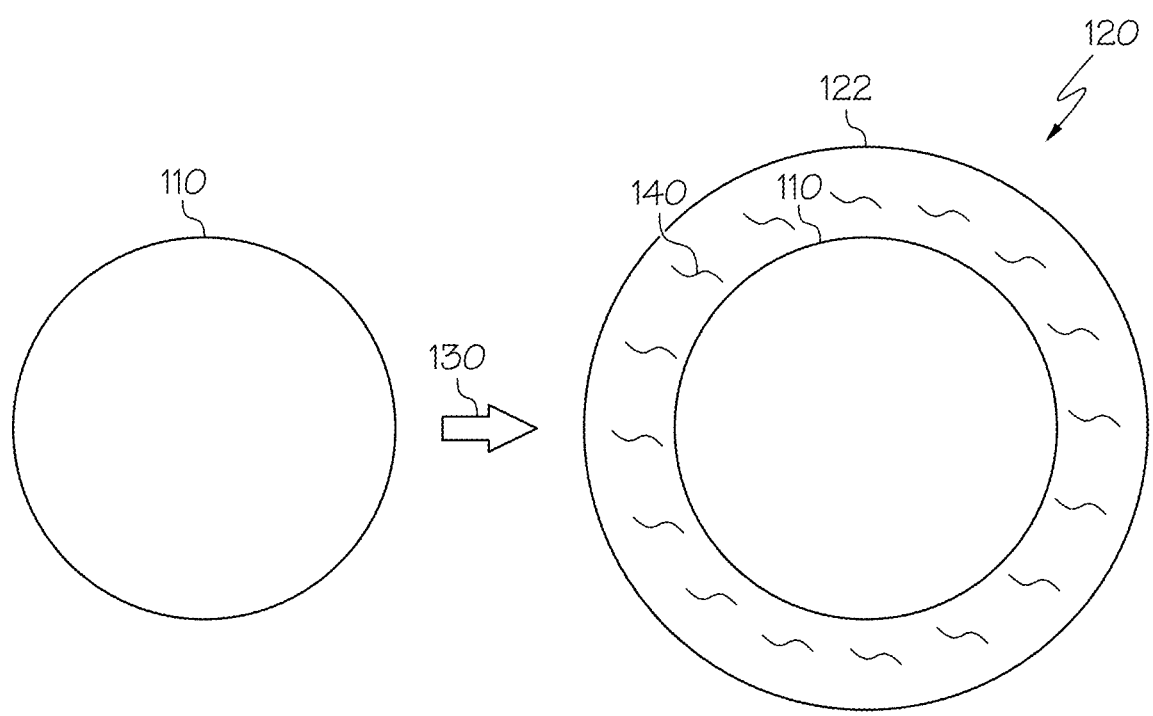
FIG. 1 schematically displays two states of a proppant particle, according to one or more embodiments described in this disclosure.

As used throughout this disclosure, the term "condensate" refers to a liquid hydrocarbon phase that generally occurs in association with natural gas. Its presence as a liquid phase depends on temperature and pressure conditions in the reservoir allowing condensation of liquid from vapor. The production of condensate reservoirs can be complicated because of the pressure sensitivity of some condensates. During production, there is a risk of the condensate changing from gas to liquid if the reservoir pressure drops to less than the dew point during production. Gas produced in association with condensate is called wet gas. The API gravity of condensate is typically 50 degrees (°) to 120°.

As used throughout this disclosure, the term "API gravity" refers to a measure of how heavy or light a petroleum liquid is compared to water. API gravity can be defined by the equation $$API \text{ gravity} = \frac{141.5}{\text{specific gravity}} - 131.5.$$

As used throughout this disclosure, the term "condensate banking" refers to a relative permeability effect where condensate drops out of the vapor phase around the wellbore when the pressure drops lesser than the dew point in response to drawdown or depletion. Gas production rate may be severely reduced by the permeability reduction.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "wellbore" refers to the drilled hole or borehole, including the open-hole or uncased portion of the well. Borehole may refer to void space defined by the wellbore wall, where the rock face that bounds the drilled hole.

As used throughout the disclosure, "aqueous" refers to a fluid containing, producing, resembling, or having the properties of water.

As used throughout this disclosure, the term "drilling fluid" refers to liquid and gaseous fluids and mixtures of fluids and solids (as solid suspensions, mixtures and emulsions of liquids, gases and solids) used in operations to drill wellbores.

As used throughout this disclosure, the term "hydraulic fracturing fluid" refers to a subset of drilling fluids that is used to carry proppants into wellbores and subsurface formations.

As used throughout this disclosure, the term "hydraulic fracturing" refers to a stimulation treatment performed on less-permeable reservoirs, such as reservoirs with a permeability of less than 10 milliDarcys. Hydraulic fracturing fluids are pumped into a subsurface formation such that fractures form. The wings of the fracture extend away from the wellbore according to the natural stresses within the subsurface formation. Proppants are mixed with the treatment fluid to keep the fracture open when the treatment is complete. Hydraulic fracturing creates fluid conductivity within a subsurface formation and bypasses damage, such as condensate banking, that may exist in the near-wellbore area.

As used throughout this disclosure, the term "wings" refers to the two cracks formed by a fracture being 180° apart and typically similar in shape and size.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "oleaginous" refers to a fluid containing, producing, resembling, or having the properties of oil.

As used throughout this disclosure, the term "proppants" refers to particles operable to hold fractures open after a hydraulic fracturing treatment.

As used throughout this disclosure, the term "reservoir" refers to a subsurface formation having sufficient porosity and permeability to store and transmit fluids.

As used throughout this disclosure, the term "aspect ratio" refers to the ratio of length to diameter.

Production wells are a fluid conduit that enables hydrocarbons to travel from the subsurface formation to the surface. However, when producing hydrocarbon gas, the wellbore and subsurface formation pressure decrease as the quantity of hydrocarbon gas in the reservoir decreases. If the pressure in the formation decreases to less than the dew point of the hydrocarbon gas, then a hydrocarbon liquid condensate forms. This liquid condensate may create a fluid blockage in the formation and limit fluid access between the formation and the wellbore.

The present disclosure is directed to compositions and methods for producing proppants with a nanocomposite coating. The nanocomposite coated proppants may include a proppant particle and a nanocomposite coating. The nanocomposite coating may include a cured resin, and a quantity of dispersed carbon nanotubes. The nanocomposite coating may coat the surface of the proppant particle. The nanocomposite coating may have a persistent dispersion homogeneity. These layers may be of uniform thickness or may include changes in thickness throughout, leading to hierarchical roughness in the nanocomposite coating.

In some embodiments, the nanocomposite coating has a persistent dispersion homogeneity. The phrase "persistent dispersion homogeneity" means that a first concentration of the carbon nanotubes at any discrete point throughout the nanocomposite coating does not vary by more than 30 percent (%) from a second concentration of the carbon nanotubes at any second discrete point throughout the nanocomposite coating. In other words, the concentration of the carbon nanotubes will not result in clumped carbon nanotubes within the nanocomposite coating. In the embodiments described in this application, the persistent dispersion homogeneity throughout the nanocomposite coating is such that for a discrete point throughout the nanocomposite coating the extrema (that is, the minimum or maximum) of the concentration of carbon nanotubes is greater than or equal to about 70% and less than or equal to about 130% of the concentration of carbon nanotubes within the nanocomposite coating at any second discrete point of the nanocomposite coating.

As previously disclosed, the carbon nanotubes enhance the mechanical strength of the nanocomposite coating and provide resistance to chemicals used in hydraulic fracturing fluid.

FIG. 1 schematically portrays two states of a proppant particle. On the left, a proppant particle 110 is depicted in a first, uncoated state. Then, on the right, a nanocomposite coated proppant 120 is depicted in which the proppant particle 110 is in a second, coated state. In the second state, the proppant particle 110 has undergone a coating step 130 to be coated with a nanocomposite coating 122, thereby forming a nanocomposite coated proppant 120. The nanocomposite coating 122 may include dispersed carbon nanotubes 140.

The proppant particle 110 may be chosen from any type of proppants suitable for use in hydraulic fracturing applications. As previously described, proppants are propping agent particles used in hydraulic fracturing fluids to maintain and hold open subsurface fractures during or following subsurface treatment. In some embodiments, the proppant particle 110 may include particles of materials such as oxides, silicates, sand, ceramic, resin, epoxy, plastic, mineral, glass, or combinations thereof. The proppant particle 110 may include graded sand, treated sand, resin-coated sand, ceramic proppants, or plastic proppants. The proppant particle 110 may include particles of bauxite, sintered bauxite, $Ti^{4+}$/polymer composites, where the superscript "4+"

stands for the oxidation state of titanium, titanium nitride (TiN), or titanium carbide. The proppant particle 110 may include glass particles or glass beads. Embodiments of the present disclosure may utilize at least one proppant particle and in embodiments in which more than one proppant particle 110 is used, the proppant particles 110 may contain a mixture of two or more different materials.

The material of the proppant particle 110 may be chosen based on the particular application and characteristics desired, such as the depth of the subsurface formation in which the proppant particles 110 will be used, as proppant particles 110 with a greater mechanical strength are needed at greater lithostatic pressures. Ceramic proppant materials may be suitable in embodiments desiring great strength, uniform size and shape, great thermal resistance and great conductivity. Fully (pre-cured) or partially cured (curable) resin-coated sand may be chosen in embodiments to provide particles of irregular size and shape with medium crush resistance strength and medium conductivity. Sands may be chosen in embodiments desiring naturally occurring and cost effective proppants or less particle strength and less conductivity.

The proppant particle 110 may include various sizes or shapes. In some embodiments, the one or more proppant particles 110 may have sizes from 8 mesh to 140 mesh (diameters from 106 micrometers (μm) to 2.36 millimeters (mm)). In some embodiments, the proppant particles 110 may have sizes from 8 mesh to 16 mesh (diam. 2380 μm to 1180 μm), 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). The sphericity and roundness of the proppant particles 110 may also vary based on the desired application.

The proppant particles 110 may have a rough surface texture that may increase adhesion of the nanocomposite coating 122 to the proppant particle. The surface of the proppant particles 110 may be roughened to increase the surface area of the proppant particle 110 by any suitable physical or chemical method, including, for example, using an appropriate etchant. In some embodiments, the proppant particle 110 may have a surface that provides a desired adherence of the nanocomposite coating 122 to the proppant particle 110 or may already be sufficiently rough without a need for chemical or physical roughening. Specifically, ball milling proppant particles 110 may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, or projections. The rough surface may have an arithmetic average roughness ($R_a$) of greater than or equal to 1 nanometer (nm) (1 nm=0.001 μm). $R_a$ is defined as the arithmetic average of the differences between the local surface heights and the average surface height and can be described by Equation 1, contemplating n measurements:

$$R_a = \frac{1}{n}\sum_{i=1}^{n} |y_i| \quad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle 110 may have an $R_a$ of greater than or equal to 2 nanometers (nm) (0.002 micrometers ((μm)), or greater than or equal to 10 nm (0.01 μm), or greater than or equal to 50 nm (0.05 μm), or greater than or equal to 100 nm (0.1 μm), or greater than or equal to 1 μm.

As previously discussed in this disclosure, the nanocomposite coating 122 includes carbon nanotubes 140 and a resin. The nanocomposite coating 122 may further include at least one of nano-silica, nano-alumina, nano-zinc oxide, nano-calcium carbonate, mica, vanadium pentoxide, boron nitride nanotubes, or nano-zirconium oxide. The prefix "nano" denotes that the substance is in particles formed on the nano scale for example, the particles may be between 1 and 100 nm in size.

The carbon nanotubes 140 may include at least one of single-walled nanotubes, double-walled nanotubes, multi-walled carbon nanotubes, or narrow-walled nanotubes. The carbon nanotubes 140 may include a diameter of from 1 nm to 200 nm, from 20 nm to 100 nm, from 10 nm to 80 nm, from 4 nm to 20 nm, from 2 nm to 12 nm, from 2 nm to 10 nm, from 2 nm to 9 nm, from 2 nm to 8 nm, from 2 nm to 7 nm, from 2 nm to 6 nm, from 2 nm to 5 nm, from 2 nm to 4 nm, from 2 nm to 3 nm, 3 nm to 12 nm, from 3 nm to 10 nm, from 3 nm to 9 nm, from 3 nm to 8 nm, from 3 nm to 7 nm, from 3 nm to 6 nm, from 3 nm to 5 nm, from 3 nm to 4 nm, 4 nm to 12 nm, from 4 nm to 10 nm, from 4 nm to 9 nm, from 4 nm to 8 nm, from 4 nm to 7 nm, from 4 nm to 6 nm, from 4 nm to 5 nm, 5 nm to 12 nm, from 5 nm to 10 nm, from 5 nm to 9 nm, from 5 nm to 8 nm, from 5 nm to 7 nm, from 5 nm to 6 nm, 6 nm to 12 nm, from 6 nm to 10 nm, from 6 nm to 9 nm, from 6 nm to 8 nm, from 6 nm to 7 nm, 7 nm to 12 nm, from 7 nm to 10 nm, from 7 nm to 9 nm, from 7 nm to 8 nm, 8 nm to 12 nm, from 8 nm to 10 nm, from 8 nm to 9 nm, 9 nm to 12 nm, from 9 nm to 10 nm, from 10 nm to 12 nm, or of 8 nm. The carbon nanotubes 140 may include a length of from 20 μm to 500 μm, 20 μm to 200 μm, 20 μm to 150 μm, 20 μm to 100 μm, 50 μm to 500 μm, from 50 μm to 200 μm, from 50 μm to 150 μm, from 50 μm to 100 μm, from 100 μm to 500 μm, from 100 μm to 200 μm, from 100 μm to 150 μm, from 150 μm to 500 μm, from 150 μm to 200 μm, or from 200 μm to 500 μm; an aspect ratio of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000. The carbon nanotubes 140 may include a specific surface area of from 100 to 12,000 square meters per gram ($m^2/g$), from 100 $m^2/g$ to 10,000 $m^2/g$, from 100 m2/g to 800 $m^2/g$, from 100 m2/g to 700 $m^2/g$, from 400 m2/g to 12,000 $m^2/g$, from 400 m2/g to 10,000 $m^2/g$, from 400 m2/g to 800 $m^2/g$, from 100 m2/g to 1,500 $m^2/g$, from 120 m2/g to 1,000 $m^2/g$, from 150 m2/g to 850 $m^2/g$, or from 400 m2/g to 700 $m^2/g$, where the specific surface area is calculated through the Brunauer-Emmett-Teller (BET) theory. The carbon nanotubes 140 may include a metal oxide percentage of 99 weight percent (wt. %) or less, 95 wt. % or less, 80 wt. % or less, 75 wt. % or less, 70 wt. % or less, 70 wt. % or less, 65 wt. % or less, 60 wt. % or less 55 wt. % or less, 50 wt. % or less, 45 wt. % or less, 40 wt. % or less, 35 wt. % or less, 30 wt. % or less, 25 wt. % or less, 20 wt. % or less, 15 wt. % or less, 10 wt. % or less, 5 wt. % or less, 3 wt. % or less, 2 wt. % or less, 1.5 wt. % or less, 1 wt % or less, or 0.5 wt. % or less. The carbon nanotubes 140 may include a bulk density of from 0.001 grams per cubic centimeter ($g/cm^3$) to 0.12 $g/cm^3$, from 0.01 $g/cm^3$ to 0.08 $g/cm^3$, from 0.02 $g/cm^3$ to 0.06 $g/cm^3$, from 0.01 $g/cm^3$ to 1 $g/cm^3$, from 0.01 $g/cm^3$ to 0.5 $g/cm^3$, from 0.01 $g/cm^3$ to 0.2 $g/cm^3$, from 0.01 $g/cm^3$ to 0.1 $g/cm^3$, from 0.01 $g/cm^3$ to 0.05 $g/cm^3$, from 0.01 $g/cm^3$ to 0.02 $g/cm^3$, from 0.02 $g/cm^3$ to 1 $g/cm^3$, from 0.02 $g/cm^3$ to 0.5 $g/cm^3$, from 0.02 $g/cm^3$ to 0.2 $g/cm^3$, from 0.02 $g/cm^3$ to 0.1 $g/cm^3$, from 0.02 $g/cm^3$ to 0.05 $g/cm^3$, from 0.05 $g/cm^3$ to 1 $g/cm^3$, from 0.05 $g/cm^3$ to 0.5 $g/cm^3$, from 0.05 $g/cm^3$ to 0.2 $g/cm^3$, from 0.05 $g/cm^3$ to 0.1 $g/cm^3$, from 0.06 $g/cm^3$ to 0.08 $g/cm^3$, from 0.1 $g/cm^3$ to 1 $g/cm^3$, 0.1 $g/cm^3$ to 0.5 $g/cm^3$, from 0.1 $g/cm^3$ to 0.2 $g/cm^3$, from 0.2 $g/cm^3$ to 1 $g/cm^3$, from 0.2 $g/cm^3$ to 0.5 $g/cm^3$, or from 0.5 $g/cm^3$ to 1 $g/cm^3$. The nanocomposite coating 122 may include less than or equal to 5 wt. %, 2 wt. %, 1.5 wt. %, 1 wt. %, 0.75 wt. %, 0.5 wt. %, 0.2 wt. %, or 0.1 wt. % of the carbon nanotubes 140. The nanocomposite coated proppant 120 may include from 0.1 wt. % to 10 wt. %, from 0.1 wt. % to 5 wt. %, from 0.1 wt. % to 3 wt. %, from 0.1 wt. % to 2 wt. %, from 0.1 wt. % to 1.5 wt. %, from 0.1 wt. % to 1 wt. %, from 0.1 wt. % to 0.5 wt. %, from 0.1 wt. % to 0.2 wt. %, 0.2 wt. % to 10 wt. %, from 0.2 wt. % to 5 wt. %, from 0.2 wt. % to 3 wt. %, from 0.2 wt. % to 2 wt. %, from 0.2 wt. % to 1.5 wt. %, from 0.2 wt. % to 1 wt. %, from 0.2 wt. % to 0.5 wt. %, from 0.5 wt. % to 10 wt. %, from 0.5 wt. % to 5 wt. %, from 0.5 wt. % to 3 wt. %, from 0.5 wt. % to 2 wt. %, from 0.5 wt. % to 1.5 wt. %, from 0.5 wt. % to 1 wt. %, from 1 wt. % to 10 wt. %, from 1 wt. % to 5 wt. %, from 1 wt. % to 3 wt. %, from 1 wt. % to 2 wt. %, from 1 wt. % to 1.5 wt. %, from 1.5 wt. % to 10 wt. %, from 1.5 wt. % to 5 wt. %, from 1.5 wt. % to 3 wt. %, from 1.5 wt. % to 2 wt. %, from 2 wt. % to 10 wt. %, from 2 wt. % to 5 wt. %, from 2 wt. % to 3 wt. %, from 3 wt. % to 10 wt. %, from 3 wt. % to 5 wt. %, or from 5 wt. % to 10 wt. % carbon nanotubes 140 as calculated by a weight of the resin.

The nanocomposite coating 122 may also include a surfactant. The surfactant may be introduced by mixing a surfactant with the uncured resin. As previously discussed in this disclosure, the nanocomposite coating 122 also includes a resin. Resin is a solid or greatly viscous substance of plant or synthetic origin that is typically convertible into polymers. Resin may be a mixture of organic compounds such as terpenes, an organic compound produced by plants. The resin may include at least one of phenol, furan, epoxy, urethane, or phenol-formaldehyde, and the phenol-formaldehyde resin may include novolac or resole. Novolacs are phenol-formaldehyde resins with a formaldehyde to phenol molar ratio of less than 1, where the phenol units are mainly linked by methylene or ether groups, or both. The novolac may include a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. Polymers of novolac may include a glass transition temperature greater than 250 degrees Fahrenheit (° F.), 300° F., 350° F., 390° F., 400° F., 450° F., or 500° F. Novolac is stable, meaning that it does not react and retains its properties, at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. Polymers of resole may include a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol.

The nanocomposite coated proppant 120 includes from 0.5 to 20 wt. %, from 0.5 to 15 wt. %, from 0.5 to 10 wt. %, from 0.5 to 8 wt. %, from 0.5 to 6 wt. %, from 0.5 to 5 wt. %, from 0.5 to 4.5 wt. %, from 0.5 to 2 wt. %, from 0.5 to 1 wt. %, 1 to 20 wt. %, from 1 to 15 wt. %, from 1 to 10 wt. %, from 1 to 8 wt. %, from 1 to 6 wt. %, from 1 to 5 wt. %, from 1 to 4.5 wt. %, from 1 to 2 wt. %, 2 to 20 wt. %, from 2 to 15 wt. %, from 2 to 10 wt. %, from 2 to 8 wt. %, from 2 to 6 wt. %, from 2 to 5 wt. %, from 2 to 4.5 wt. %, 1 to 2 wt. %, 4.5 to 20 wt. %, from 4.5 to 15 wt. %, from 4.5 to 10 wt. %, from 4.5 to 8 wt. %, from 4.5 to 6 wt. %, from 4.5 to 5 wt. %, 5 to 20 wt. %, from 5 to 15 wt. %, from 5 to 10 wt. %, from 5 to 8 wt. %, from 5 to 6 wt. %, 8 to 20 wt. %, from 8 to 15 wt. %, from 8 to 10 wt. %, from 10 to 15 wt. %, from 10 to 20 wt. %, or from 15 to 20 wt. % resin as calculated by a weight of the proppant particles 110.

In one embodiment, the nanocomposite coating 122 includes silicon carbide nanotubes (Si-CNT). Si-CNT carbon nanotubes may refer to one of nanotubes constructed of silicon carbide, to carbon nanotubes coated with silicon, to carbon nanotubes coated with silicon carbide, or to a combination thereof. Si-CNT may provide additional thermal stability and mechanical strength.

Figure 2:
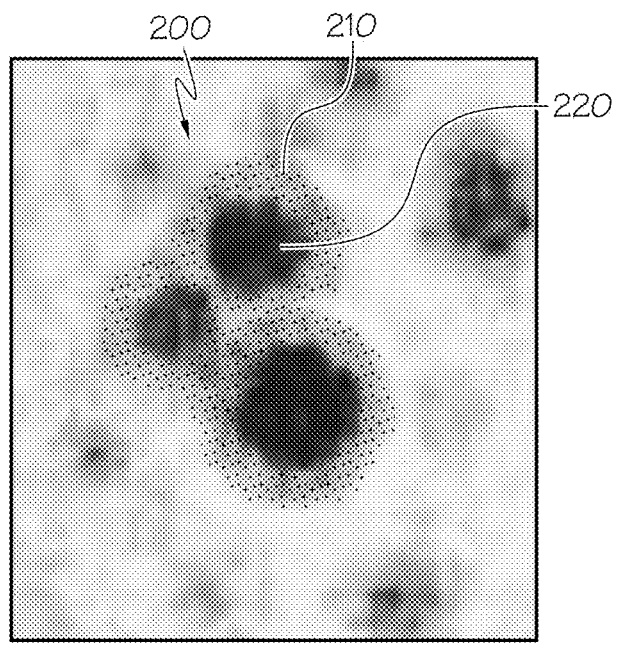
FIG. 2 photographically depicts metal oxide catalyst nanoparticles, according to one or more embodiments described in this disclosure.

Referring now to FIGS. 1 and 2, a method of making a nanocomposite coated proppant 120 with a nanocomposite coating 122 may include adding a quantity of precursor nanoparticles including carbon nanotubes 140 supported by metal oxide catalyst nanoparticles 200 to an uncured resin. The metal oxide catalyst nanoparticles 200 and the uncured resin may be selected such that the metal oxide catalyst nanoparticles 200 are dissolvable in the uncured resin. The metal oxide catalyst nanoparticles 200 are operable to dissolve in the uncured resin, which results in an amount of carbon nanotubes 140 dispersed within the uncured resin. The amount of carbon nanotubes 140 dispersed within the uncured resin forms the nanocomposite coating. The method further includes coating proppant particles 110 with the nanocomposite coating to make the nanocomposite coated proppants.

The weight ratio of dispersed carbon nanotubes 140 to resin may be from 1:1000 to 1:10. For example, the weight ratio of dispersed carbon nanotubes 140 to resin may be from 1:1000 to 1:800, from 1:800 to 1:600, from 1:600 to 1:400, from 1:400 to 1:200, from 1:200 to 1:100, from 1:100 to 1:75, from 1:75 to 1:50, from 1:50 to 1:25, from 1:25 to 1:10, or any combination thereof.

In another embodiment, the nanocomposite coating 122 includes silica ($SiO_2$) coated carbon nanotubes ($SiO_2$—CNT). $SiO_2$ coated multi-walled carbon nanotubes may better fuse with neighboring proppant in a subsurface formation, generating a stronger proppant pack. This strengthened proppant pack may mitigate proppant flowback.

The method may involve adding a quantity of precursor nanoparticles including carbon nanotubes 140 coated on metal oxide catalyst nanoparticles 200 to the resin. The metal oxide catalyst nanoparticles 200 are operable to dissolve in the resin, which results in the carbon nanotubes 140 dispersed within the resin. The carbon nanotubes 140 dispersed within the resin forms the nanocomposite coating. The method may still further include coating a proppant particle with the nanocomposite coating.

Referring to FIG. 2, individual nanoparticles of the metal oxide catalyst nanoparticles 200 may include a metal oxide 220 and a transition metal 210. The transition metal 210 may include iron (Fe), cobalt (Co), or nickel (Ni). In other embodiments, the transition metal 210 may include at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, ununbium, or combinations thereof.

The metal oxide catalyst nanoparticles 200 may include 10 wt. % or less transition metal 210 as calculated by a weight of the metal oxides 220. In other embodiments, the metal oxide catalyst nanoparticles 200 may include from 0 wt. % to 10 wt. %, from 1 wt. % to 10 wt. %, from 2 wt. % to 10 wt. %, from 3 wt. % to 10 wt. %, from 4 wt. % to 10 wt. %, from 5 wt. % to 10 wt. %, from 6 wt. % to 10 wt. %, from 7 wt. % to 10 wt. %, from 8 wt. % to 10 wt. %, from 9 wt. % to 10 wt. %, from 1 wt. % to 9 wt. %, from 2 wt. % to 9 wt. %, from 3 wt. % to 9 wt. %, from 4 wt. % to 9 wt. %, from 5 wt. % to 9 wt. %, from 6 wt. % to 9 wt. %, from 7 wt. % to 9 wt. %, from 8 wt. % to 9 wt. %, from 1 wt. % to 8 wt. %, from 2 wt. % to 8 wt. %, from 3 wt. % to 8 wt. %, from 4 wt. % to 8 wt. %, from 5 wt. % to 8 wt. %, from 6 wt. % to 8 wt. %, from 7 wt. % to 8 wt. %, from 1 wt. % to 7 wt. %, from 2 wt. % to 7 wt. %, from 3 wt. % to 7 wt. %, from 4 wt. % to 7 wt. %, from 5 wt. % to 7 wt. %, from 6 wt. % to 7 wt. %, from 1 wt. % to 6 wt. %, from 2 wt. % to 6 wt. %, from 3 wt. % to 6 wt. %, from 4 wt. % to 6 wt. %, from 5 wt. % to 6 wt. %, from 1 wt. % to 5 wt. %, from 2 wt. % to 5 wt. %, from 3 wt. % to 5 wt. %, from 4 wt. % to 5 wt. %, from 1 wt. % to 4 wt. %, from 2 wt. % to 4 wt. %, from 3 wt. % to 4 wt. %, from 1 wt. % to 3 wt. %, from 2 wt. % to 3 wt. %, from 1 wt. % to 2 wt. %, or from 0 wt. % to 1 wt. % transition metal 210 as calculated by a weight of the metal oxides 220.

The metal oxides 220 may include at least one of lithium oxide, sodium oxide, potassium oxide, rubidium oxide, magnesium oxide (MgO), calcium oxide (CaO), beryllium oxide, strontium oxide, barium oxide, radium oxide, scandium oxide, yttrium oxide, titanium oxide, zirconium oxide, vanadium oxide, niobium oxide, chromium oxide, molybdenum oxide, manganese oxide, technetium oxide, iron oxide, ruthenium oxide, cobalt oxide, rhodium oxide, nickel oxide, palladium oxide, copper oxide, silver oxide, gold oxide, platinum oxide, zinc oxide, cadmium oxide, mercury oxide, aluminum oxide, gallium oxide, indium oxide, tin oxide, thallium oxide, lead oxide, boron oxide, silicon oxide, or combinations thereof. According to some embodiments, the metal oxide 220 includes MgO or CaO. The metal oxides 220 may be conventional resin additives. The metal oxides 220 may be chemicals conventionally used as buffers in resin. The metal oxides 220 may be chemicals conventionally used to increase the pH of resin. The metal oxides 220 may be alkaline, and may have a pH of greater than 7, of from 8 to 14, of from 9 to 14, of from 10 to 14, of from 11 to 14, of from 11.5 to 14, of from 12 to 14, of from 12.5 to 14, of from 13 to 14, of from 8 to 13, of from 9 to 13, of from 10 to 13, of from 11 to 13, of from 11.5 to 13, of from 12 to 13, of from 12.5 to 13, of from 8 to 12.5, of from 9 to 12.5, of from 10 to 12.5, of from 11 to 12.5, of from 11.5 to 12.5, of from 12 to 12.5, of from 8 to 12, of from 9 to 12, of from 10 to 12, of from 11 to 12, of from 11.5 to 12, of from 8 to 11.5, of from 9 to 11.5, of from 10 to 11.5, of from 11 to 11.5, of from 8 to 11, of from 9 to 11, of from 10 to 11, of from 8 to 10, of from 9 to 10, of from 8 to 9, or of 12.8. The metal oxides 220 may have a $pK_a$ value of from 10 to 15, of from 11 to 14, of from 12 to 13, or of 12.8. In some embodiments, the metal oxide catalyst nanoparticles 200 may include metal oxides 220 including at least one of magnesium oxide (MgO) or calcium oxide (CaO). CaO may have a $pK_a$ value of from 10 to 15, of from 11 to 14, of from 12 to 13, or of 12.8.

In some embodiments, the transition metal 210 is disposed on the metal oxide 220. The transition metal 210 may be adsorbed onto the metal oxide 220. The carbon nanotubes 140 may be adsorbed onto the metal oxide catalyst nanoparticles 200.

In some embodiments, the method includes synthesizing carbon nanotubes 140 via chemical vapor deposition on metal oxide catalyst nanoparticles 200 to form the quantity of precursor nanoparticles. The method may further include adding the precursor nanoparticles to the resin. The metal oxides 220 are operable to dissolve in the resin, which results in the carbon nanotubes 140 dispersed within the resin. This carbon nanotube dispersion within the resin forms the nanocomposite coating. The method may then further include coating a proppant particle 110 with the nanocomposite coating 122. Synthesizing carbon nanotubes 140 via chemical vapor deposition on metal oxide catalyst nanoparticles 200 may include diffusing carbon atoms through the carbon nanotubes 140. Synthesizing carbon nanotubes 140 via chemical vapor deposition on metal oxide catalyst nanoparticles 200 may include diffusing carbon atoms along a surface of individual nanoparticles of the metal oxide catalyst nanoparticles 200.

In one embodiment, synthesizing carbon nanotubes 140 via chemical vapor deposition on metal oxides 220 to form precursor nanoparticles may include mixing an aqueous solution including the transition metal 210 with an aqueous suspension of the metal oxides 220 to form a mixture. In some embodiments, the aqueous suspension may include from 5 to 50 wt. %, from 5 to 30 wt. %, from 5 to 25 wt. %, from 5 to 20 wt. %, from 5 to 15 wt. %, from 5 to 10 wt. %, from 10 to 50 wt. %, from 10 to 30 wt. %, from 10 to 25 wt.

%, from 10 to 20 wt. %, from 10 to 15 wt. %, from 15 to 50 wt. %, from 15 to 30 wt. %, from 15 to 25 wt. %, from 15 to 20 wt. %, from 20 to 50 wt. %, from 20 to 30 wt. %, from 20 to 25 wt. %, from 25 to 50 wt. %, from 25 to 30 wt. %, from 30 to 50 wt. % metal oxides 220 as calculated by a weight of the aqueous suspension. Synthesizing the carbon nanotubes 140 may then include stirring the mixture, drying the mixture at room temperature, and then grinding the mixture into a powder to form the metal oxide catalyst nanoparticles 200.

In an alternate embodiment, synthesizing carbon nanotubes 140 via chemical vapor deposition on metal oxide catalyst nanoparticles 200 to form precursor nanoparticles may include mixing an aqueous solution including the transition metal 210 with a powder including the metal oxide 220 to form a mixture. Synthesizing the carbon nanotubes 140 may then include stirring the mixture and calcining the mixture at from 100 degrees Celsius (° C.) to 500° C., from 200° C. to 500° C., from 300° C. to 500° C., from 200° C. to 400° C., or from 300° C. to 400° C. for from 5 to 15 hours, from 5 to 12 hours, from 5 to 10 hours, from 5 to 8 hours, from 8 to 15 hours, from 8 to 12 hours, from 8 to 10 hours, from 10 to 15 hours, from 10 to 12 hours, or from 12 to 15 hours. Synthesizing the carbon nanotubes 140 may then include grinding the mixture into a powder to form the metal oxide catalyst nanoparticles 200.

Synthesizing the carbon nanotubes 140 may further include heating the metal oxide catalyst nanoparticles from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments this may include placing the metal oxide catalyst nanoparticles 200 into an oven or a reactor. In some embodiments, synthesizing the carbon nanotubes 140 may include placing carbon precursors in the oven, the carbon precursors vaporize as the oven heats, to form precursor nanoparticles including carbon nanotubes 140 on the metal oxide catalyst nanoparticles 200. In other embodiments, synthesizing the carbon nanotubes 140 may include flowing a gas mixture over the metal oxide catalyst nanoparticles 200 to form precursor nanoparticles including carbon nanotubes 140. In some embodiments, the gas mixture may include argon, hydrogen, benzene, methylnaphthalene, ethylene, propylene, butylene, toluene, xylene, graphite, acetylene, ethanol, methane, carbon monoxide, carbon dioxide, hydrocarbon gases, any carbon-based gas, and combinations of these. The term "hydrocarbon gas" refers to a compound consisting of hydrogen and carbon atoms in a gas phase at standard temperature and pressure. Non-limiting examples of hydrocarbon gas are paraffinic hydrocarbons and alkylaromatic hydrocarbons. The phrase "carbon-based gas" means that the gas is a gas other than a hydrocarbon gas, in which the gas comprises compounds that include carbon atoms. Specifically, in one embodiment, the gas mixture may include argon, hydrogen, and ethylene.

In some embodiments, heating the metal oxide catalyst nanoparticles 200 includes flowing a gas mixture over the metal oxide catalyst nanoparticles 200 with a heating rate of from 1 degree Celsius per minute (° C./min.) to 20° C./min., from 3° C./min. to 10° C./min., from 5° C./min. to 10° C./min., from 5° C./min. to 7° C./min., or of 5° C./min. until the metal oxides 220 are heated to ranges disclosed previously. The method may further include adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % carbon-based gas, as calculated by a volume of the gas mixture, to the gas mixture. The method may still further include flowing the gas mixture over the metal oxide catalyst nanoparticles 200 to form precursor nanoparticles including carbon nanotubes 140. The carbon-based gas may include any gas that includes carbon, such as, as nonlimiting examples, carbon dioxide, graphite, acetylene, ethylene, ethanol, methane, carbon monoxide, or hydrocarbon gases. In some embodiments, the carbon-based gas may be ethylene. The gas mixture including argon, hydrogen, and ethylene may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 400 to 1000 milliliters per minute (ml/min.), from 500 to 800 ml/min., from 600 to 800 ml/min., or at 700 ml/min.

When the gas mixture contacts the metal oxide catalyst nanoparticles 200, the gas may decompose into carbon that dissolves into the metal oxide catalyst nanoparticles 200. After reaching the carbon-solubility limit in the metal oxide catalyst nanoparticles 200, the carbon may precipitate on the surface of the metal oxide catalyst nanoparticle and crystallize in the form of a cylindrical network, forming a carbon nanotube. In some embodiments, the gas mixture may contact the transition metal 210 and decompose into carbon that dissolves into the transition metal 210. After reaching the carbon-solubility limit in the transition metal 210, the carbon may precipitate on the surface of the transition metal 210 and crystallize in the form of a cylindrical network, forming a carbon nanotube 140. As stated previously, the carbon nanotubes 140 are supported by the metal oxide catalyst nanoparticles 200. The carbon nanotubes 140 being supported by the metal oxide catalyst nanoparticles 200 may include carbon nanotubes 140 adsorbed onto a surface of the metal oxide catalyst nanoparticles 200. In some embodiments, the carbon nanotubes 140 being supported by the metal oxide catalyst nanoparticles 200 may include carbon nanotubes 140 bonded to a surface of the metal oxide catalyst nanoparticles 200.

Synthesizing the carbon nanotubes 140 via chemical vapor deposition on metal oxide catalyst nanoparticles 200 may include diffusing carbon atoms through the carbon nanotubes 140. This is conventionally referred to as "tip growth." When the transition metal 210-metal oxide 220 interaction is weak (when the transition metal 210 has an acute contact angle with the metal oxide 220), carbon decomposes on the top surface of the transition metal 210, and diffuses through the transition metal 210. This causes the carbon nanotube 140 to precipitate between the transition metal 210 and the metal oxides 220, to continue to grow between the transition metal 210 and the metal oxides 220, and to push the transition metal 210 off the metal oxide 220.

Figure 3:
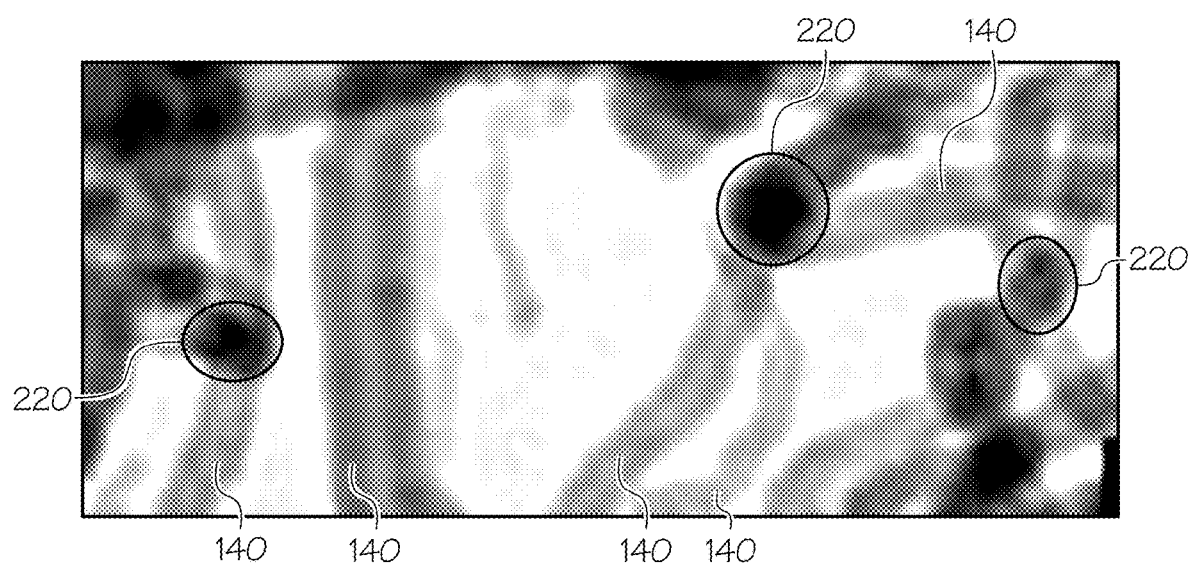
FIG. 3 photographically depicts carbon nanotubes supported by metal oxides, according to one or more embodiments described in this disclosure.

Once the transition metal 210 is fully covered with excess carbon, its catalytic activity ceases and the carbon nanotube 140 ceases to grow. FIG. 3 photographically represents carbon nanotubes 140 grown via tip growth. The carbon nanotubes 140 are shown adsorbed onto the metal oxide 220.

In another embodiment, synthesizing carbon nanotubes 140 via chemical vapor deposition on metal oxide catalyst nanoparticles 200 includes diffusing carbon atoms along a surface of individual nanoparticles of the metal oxide catalyst nanoparticles 200. This is conventionally referred to as "base growth." When the transition metal 210-metal oxide 220 interaction is strong (when the transition metal 210 has an obtuse contact angle with the metal oxide 220), the initial carbon decomposition and diffusion takes place similarly to that in tip growth, but as the carbon nanotube precipitates, the carbon nanotube precipitation fails to push the transition metal 210 off the metal oxide 220. This, in turn, forces the carbon nanotube to grow from the apex of the transition metal 210. The apex of the transition metal 210 is the point on the transition metal 210 farthest from the metal oxide. The carbon crystallizes initially as a hemispherical dome. As the carbon continues to crystallize it grows in the form of a cylinder, forming a carbon nanotube 140. Unlike in tip growth, where the carbon nanotube 140 grows from the tip (or from the top down), in base growth, the carbon nanotube 140 grows from the base (or from the bottom up), as the transition metal 210 continues to be disposed on the metal oxides 220. Subsequent hydrocarbon decomposition takes place on the lesser peripheral surface of the transition metal 210, and as-dissolved carbon diffuses upward. In other words, unlike in tip growth, where the carbon nanotube 140 grows from the tip (or from the top down), in base growth, the carbon nanotube 140 grows from the base (or from the bottom up), as the transition metal 210 continues to be disposed on the metal oxide 220. Thus, in base growth, the carbon nanotube 140 grows up with the transition metal 210 rooted on the base of the carbon nanotube 140.

As previously stated, the carbon nanotubes 140 may include silicon carbide nanotubes (Si-CNT). Silicon carbide may be included to provide improved physical properties, electronic properties, or chemical resistance.

In some embodiments, the method may further include synthesizing silicon carbide nanotubes supported by metal oxide catalyst nanoparticles 200. Synthesizing silicon carbide nanotubes may include exposing the carbon nanotubes 140 supported by metal oxide catalyst nanoparticles 200 to silicon vapor to create a quantity of silicon carbide precursor nanoparticles including silicon carbide nanotubes supported by metal oxide catalyst nanoparticles 200.

Synthesizing silicon carbide nanotubes may further include heating the carbon nanotubes 140 supported by metal oxide catalyst nanoparticles 200 to from 300° C. to 1600° C., from 300° C. to 1400° C., from 300° C. to 1200° C., from 300° C. to 1000° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1000° C., from 600° C. to 1200° C., from 600° C. to 1400° C., from 600° C. to 1600° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, heating the carbon nanotubes 140 supported by metal oxide catalyst nanoparticles 200 may include placing the carbon nanotubes 140 supported by metal oxide catalyst nanoparticles 200 into an oven or a reactor. In some embodiments, the reactor may be evacuated to an absolute pressure of from $1\times10^{-100}$ Torr to $1\times10^{-50}$ Torr, $1\times10^{-50}$ Torr to $1\times10^{-25}$ Torr, $1\times10^{-25}$ Torr to $1\times10^{-10}$ Torr, $1\times10^{-10}$ Torr to $1\times10^{-5}$ Torr, $1\times10^{-5}$ Torr to $1\times10{-1}$ Torr, $1\times10^{-1}$ Torr to 0.5 Torr, 0.5 Torr to 1 Torr, 1 Torr to 10 Torr, 10 Torr to 20 Torr, 20 Torr to 40, 40 Torr to 50 Torr, 50 Torr to 100 Torr, 100 Torr to 150 Torr, 150 Torr to 300 Torr, 300 Torr to 450 Torr, 450 Torr to 600 Torr, 600 Torr to 750 Torr, or any combination thereof.

In some embodiments, synthesizing the silicon carbide nanotubes supported by metal oxide catalyst nanoparticles 200 may include placing silicon precursors in the oven. The silicon precursors vaporize as the oven heats to form the quantity of silicon carbide precursor nanoparticles including silicon carbide nanotubes and metal oxide catalyst nanoparticles 200. In other embodiments, synthesizing the silicon carbide nanotubes may include flowing a gas mixture over the carbon nanotubes 140 to form the quantity of silicon carbide precursor nanoparticles including silicon carbide nanotubes and metal oxide catalyst nanoparticles 200. In some embodiments, the gas mixture may include argon, hydrogen, silicon, methyltrichlorosilane, any other gas containing silicon, and combinations thereof. Specifically, in one embodiment, the gas mixture may include argon, hydrogen, and methyltrichlorosilane.

In some embodiments, heating the carbon nanotubes 140 supported by metal oxide catalyst nanoparticles 200 includes flowing a gas mixture over the carbon nanotubes 140 supported by metal oxide catalyst nanoparticles 200 with a heating rate of from 1° C./min. to 20° C./min., from 3° C./min. to 10° C./min., from 5° C./min. to 10° C./min., from 5° C./min. to 7° C./min., or of 5° C./min. until the carbon nanotubes 140 supported by metal oxide catalyst nanoparticles 200 are heated to ranges disclosed previously. The method may further include adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % silicon-based gas, as calculated by a volume of the gas mixture, to the gas mixture. The method may further include flowing the gas mixture over the carbon nanotubes 140 supported by metal oxide catalyst nanoparticles 200 to form silicon carbide precursor nanoparticles including silicon carbide nanotubes and metal oxide catalyst nanoparticles 200. The silicon-based gas may include any gas that includes silicon, such as, as nonlimiting examples, methyltrichlorosilane, N-sec-butyl (trimethylsilyl)amine, chloropentamethyldisilane, hexamethyldisilane, pentamethyldisilane, silicon tetrabromide, triethylsilane, or mixtures thereof. The gas mixture including argon, hydrogen, and silicon may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 10 to 1000 ml/min., from 50 to 800 ml/min., from 100 to 400 ml/min., or at 150 ml/min. According to some embodiments, the gas mixture may be prepared by flowing hydrogen gas through methyltricholorosilane, thereby generating the silicon-based gas.

The silicon carbide nanotubes supported by metal oxide catalyst nanoparticles 200 may be annealed in air at an elevated temperature. As used in this disclosure, annealing refers to the process of heating a substrate under a specific atmosphere to an annealing temperature, holding the substrate at the annealing temperature for a period of time and cooling the substrate. An annealing temperature is a temperature less than the melting temperature of the substrate. For example, the silicon carbide nanotubes supported by metal oxide catalyst nanoparticles 200 may be annealed at a temperature from 500° C. to 600° C., from 600° C. to 700° C., from 700° C. to 800° C., from 800° C. to 900° C., from 900° C. to 1000° C., from 1000° C. to 1100° C., from 1100° C. to 1200° C., from 1200° C. to 1300° C., from 1300° C. to 1400° C., from 1400° C. to 1500° C., from 1500° C. to 1600° C., from 1600° C. to 1700° C., from 1700° C. to 1800° C., or any combination thereof. For example, the silicon carbide nanotubes supported by metal oxide catalyst nanoparticles 200 may be held at the annealing temperature for from 0.001 minute (min) to 5 min, from 5 min to 10 min, from 10 min to 20 min, from 20 min to 30 min, from 30 min to 40 min, from 40 min to 50 min, from 50 min to 60 min, from 60 min to 70 min, or even greater than 70 min, or any combination thereof. The annealing step may further include a cooling step in which the temperature of the silicon carbide nanotubes supported by metal oxide catalyst nanoparticles 200 may be reduced by from 200° C./min. to 150° C./min., from 150° C./min. to 100° C./min., from 100° C./min. to 50° C./min., from 50° C./min. to 25° C./min., from 25° C./min. to 20° C./min., from 20° C./min. to 15° C./min., from 15° C./min. to 10° C./min., from 10° C./min. to 5° C./min., from 5° C./min. to 1° C./min., from 1° C./min. to 0.5° C./min., from 0.5° C./min. to 0.1° C./min., or even less than 0.1° C./min., or any combination thereof. The annealing step may occur under a specific atmosphere where the specific atmosphere includes air, inert gas, a reducing gas, an oxidizing gas, or a combination thereof.

As stated previously, the method may include adding the particles to the resin. The metal oxides 220 are operable to dissolve in the resin, which results in the carbon nanotubes 140 dispersed within the resin. The carbon nanotubes 140 are dispersed within the resin in approximately the same placement and orientation they were in before the metal oxides 220 dissolved. This results in dispersed carbon nanotubes 140 throughout the resin. Furthermore, no clumps of carbon nanotubes 140 are formed using the presently disclosed method, unlike with conventional methods.

Furthermore, as the metal oxides 220 dissolve, the metal oxides 220 may serve as a pH buffer. In some embodiments, the metal oxides 220 may increase the pH of the resin to greater than 7. In some embodiments, the metal oxides 220 may increase the pH of the resin to from 9 to 12, from 9 to 11, from 9 to 10.5, from 9 to 10, from 10 to 12, from 10 to 11, from 10 to 10.5, from 10.5 to 12, from 10.5 to 11, or from 11 to 12. Specifically, the metal oxides 220 may increase the pH of the resin with a first pH of from 5 to 9, of from 6 to 8, of from 6.5 to 7.5, or of 7 to a second pH of from 9 to 12, from 9 to 11, from 9 to 10.5, from 9 to 10, from 10 to 12, from 10 to 11, from 10 to 10.5, from 10.5 to 12, from 10.5 to 11, or from 11 to 12.

According to some embodiments, the metal oxides 220 may be solubilized and separated from the carbon nanotubes 140 when the metal oxides 220 dissolve. In some embodiments, the carbon nanotubes 140 may remain anchored to the metal oxide 220 as the entire metal oxide 220 dissolves and disperses. In the dissolving step, the pH may be raised to a pH of 2 to 3, 3 to 4, 4 to 5, 5 to 6, 6 to 7, 7 to 8, 8 to 9, 9 to 10, 10 to 11, 11 to 12, 12 to 13, 13 to 14, or any combination thereof. In the dissolving step, the pH may be lessened to a pH of 1 to 2, 2 to 3, 3 to 4, 4 to 5, 5 to 6, 6 to 7, 7 to 8, 8 to 9, 9 to 10, 10 to 11, 11 to 12, 12 to 13, or any combination thereof. In the dissolving step, the temperature may be raised to a temperature from 20° C. to 30° C., 30° C. to 40° C., 40° C. to 50° C., 50° C. to 75° C., 75° C. to 100° C., 100° C. to 125° C., 125° C. to 150° C., 150° C. to 175° C., 175° C. to 200° C., 200° C. to 250° C., 250° C. to 300° C., 300° C. to 350° C., 350° C. to 400° C., 400° C. to 450° C., 450° C. to 500° C., 500° C. to 600° C., 600° C. to 700° C., 700° C. to 800° C., 800° C. to 900° C., 900° C. to 1000° C., 1000° C. to 1100° C., 1100° C. to 1200° C., or even greater than 1200° C., or any combination thereof. It should be understood that in some cases, such as with microwave heating, the local temperature may be elevated around the metal oxide catalyst nanoparticles while the bulk temperature stays the same or increases to a lesser degree.

In some embodiments, the method may further include functionalizing a surface of the carbon nanotubes 140 as the metal oxides 220 dissolve in the resin. In some embodiments, this may include functionalizing the surface of the carbon nanotubes 140 with hydrophilic functional groups. The hydrophilic functional groups may include hydroxyl groups, carbonyl groups, carboxyl groups, amino groups, sulfhydryl groups, phosphate groups, and combinations thereof. Specifically, the method may further include functionalizing a surface of the carbon nanotubes 140 with at least one of carboxylates, ammonium derivatives, sulfonated monomers, oligomers, or polymers, after the metal oxides 220 dissolve in the resin.

The dispersed carbon nanotubes 140 may increase the viscosity of the uncured resin with the dispersed carbon nanotubes versus a similar or equivalent uncured resin without the carbon nanotube dispersion by 500 centiPoise (cP). In some embodiments, the dispersed carbon nanotubes 140 may increase the viscosity of the uncured resin with the dispersed carbon nanotubes versus a similar or equivalent uncured resin without the carbon nanotube dispersion by from 5 to 2000 cP, from 5 to 1000 cP, from 5 to 700 cP, from 5 to 600 cP, from 5 to 500 cP, from 5 to 400 cP, from 5 to 200 cP, from 5 to 100 cP, from 5 to 50 cP, from 50 to 2000 cP, from 50 to 1000 cP, from 50 to 700 cP, from 50 to 600 cP, from 50 to 500 cP, from 50 to 400 cP, from 50 to 200 cP, from 50 to 100 cP, from 100 to 2000 cP, from 100 to 1000 cP, from 100 to 700 cP, from 100 to 600 cP, from 100 to 500 cP, from 100 to 400 cP, from 100 to 200 cP, from 200 to 2000 cP, from 200 to 1000 cP, from 200 to 700 cP, from 200 to 600 cP, from 200 to 500 cP, from 200 to 400 cP, from 400 to 2000 cP, from 400 to 1000 cP, from 400 to 700 cP, from 400 to 600 cP, from 400 to 500 cP, from 500 to 2000 cP, from 500 to 1000 cP, from 500 to 700 cP, from 500 to 600 cP, from 600 to 2000 cP, from 600 to 1000 cP, from 600 to 700 cP, from 700 to 2000 cP, from 700 to 1000 cP, or from 1000 to 2000 cP.

The method may further include adding the additives previously described into the resin. Adding the additives may involve mixing the additives into the resin. In some embodiments, the resin may be mixed at a shear speed of from 4000 rotations per minute (RPM) to 16000 RPM. The resin may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM.

The nanocomposite coating 122 may further include a tracer material. The suitable tracer material may include, but is not limited to, ionic contrast agents such as thorium dioxide (ThO$_2$), barium sulfate (BaSO$_4$), diatrizoate, metrizoate, iothalamate, and ioxaglate; and non-ionic contrast agents such as iopamidol, iohexol, ioxilan, iopromide, iodixanol, and ioversol. Furthermore, the tracer material may be present in a range of from 0.001 to 5.0 wt. %, from 0.001 to 3 wt. %, from 0.001 to 1 wt. %, from 0.001 to 0.5 wt. %, from 0.001 to 0.1 wt. %, from 0.005 wt. %, from 0.005 to 5.0 wt. %, from 0.005 to 3 wt. %, from 0.005 to 1 wt. %, from 0.005 to 0.5 wt. %, from 0.005 to 0.1 wt. %, from 0.01 to 5.0 wt. %, from 0.01 to 3 wt. %, from 0.01 to 1 wt. %, from 0.01 to 0.5 wt. %, from 0.5 to 5.0 wt. %, from 0.5 to 3 wt. %, from 0.5 to 1 wt. %, from 1 to 5.0 wt. %, from 1 to 3 wt. %, or from 3 to 5 wt. %.

The nanocomposite coating 122 may further include a coupling agent. A coupling agent is a compound that provides a chemical bond between two dissimilar materials, such as an inorganic material and an organic material. The coupling agent may form a bond between the silica substrate and the resin. In some embodiments, the coupling agent may include at least one of 3-glycidoxypropyltrimethoxysilane, 3-aminopropyltriethoxysilane, 3-aminopropyltrimethoxysilane, and 3-chloropropyltrimethoxysilane. The coupling agent may include from 0.1 to 20 volume percent (vol. %), from 0.1 to 15 vol. %, from 0.1 to 10 vol. %, from 0.1 to 5 vol. %, from 0.1 to 3 vol. %, from 0.1 to 1 vol. %, from 0.1 to 0.5 vol %, 0.1 to 20 vol. %, from 0.5 to 20 vol. %, from 0.5 to 15 vol. %, from 0.5 to 10 vol. %, from 0.5 to 5 vol. %, from 0.5 to 3 vol. %, from 0.5 to 1 vol. %, from 1 to 20 vol. %, from 1 to 15 vol. %, from 1 to 10 vol. %, from 1 to 5 vol. %, from 1 to 3 vol. %, from 3 to 20 vol. %, from 3 to 15 vol. %, from 3 to 10 vol. %, from 3 to 5 vol. %, from 5 to 20 vol. %, from 5 to 15 vol. %, from 5 to 10 vol. %, from 10 to 20 vol. %, from 10 to 15 vol. %, or from 15 to 20 vol. % 3-glycidoxypropyltrimethoxysilane and from 80 to 99.9 vol. %, from 80 to 99.5 vol. %, from 80 to 99 vol. %, from 80 to 95 vol. %, from 80 to 90 vol. %, from 80 to 85 vol. %, from 85 to 99.9 vol. %, from 85 to 99.5 vol. %, from 85 to 99 vol. %, from 85 to 95 vol. %, from 85 to 90 vol. %, from 90 to 99.9 vol. %, from 90 to 99.5 vol. %, from 90 to 99 vol. %, from 90 to 95 vol. %, 95 to 99.9 vol. %, from 95 to 99.5 vol. %, from 95 to 99 vol. %, from 99 to 99.9 vol. %, from 99 to 99.5 vol. %, from 99 to 99.9 vol. %, or from 99.5 to 99.9 vol. % deionized water. The nanocomposite coating 122 may include from 0.001 to 20 wt. %, from 0.001 to 15 wt. %, from 0.001 to 10 wt. %, from 0.001 to 5 wt. %, from 0.001 to 2 wt. %, from 0.001 to 1 wt. %, from 0.001 to 0.2 wt. %, from 0.001 to 0.05 wt. %, from 0.05 to 20 wt. %, from 0.05 to 15 wt. %, from 0.05 to 10 wt. %, from 0.05 to 5 wt. %, from 0.05 to 2 wt. %, from 0.05 to 1 wt. %, from 0.05 to 0.2 wt. %, from 0.2 to 20 wt. %, from 0.2 to 15 wt. %, from 0.2 to 10 wt. %, from 0.2 to 5 wt. %, from 0.2 to 2 wt. %, from 0.2 to 1 wt. %, from 1 to 20 wt. %, from 1 to 15 wt. %, from 1 to 10 wt. %, from 1 to 5 wt. %, from 1 to 2 wt. %, from 2 to 20 wt. %, from 2 to 15 wt. %, from 2 to 10 wt. %, from 2 to 5 wt. %, from 5 to 20 wt. %, from 5 to 15 wt. %, from 5 to 10 wt. %, from 10 to 20 wt. %, from 10 to 15 wt. %, or from 15 to 20 wt. % coupling agent as calculated by a weight of the resin.

The nanocomposite coating 122 may further include a crosslinker. A crosslinker is a substance or agent that induces the formation of crosslinks. Mixing an unpolymerized or partially polymerized resin with a crosslinker results in a chemical reaction that crosslinks the resin. A crosslinked nanocomposite coating 122 may retain its shape without dissolving in the hydraulic fracturing fluid while maintaining a sufficient attraction or bond to the proppant particle. The degree of crosslinking may be controlled by the molar or weight ratio of crosslinker to monomer. In some embodiments, the crosslinker may include at least one of hexamethylenetetramine, paraformaldehyde, oxazolidines, melamine resins, aldehyde donors, or resole polymers. The proppants may include from 8 to 20 wt. %, from 8 to 18 wt. %, from 8 to 15 wt. %, from 10 to 20 wt. %, from 10 to 18 wt. %, from 10 to 15 wt. %, from 13 to 20 wt. %, from 13 to 18 wt. %, or from 13 to 15 wt. % crosslinker as calculated by a weight of the resin.

In some embodiments, the nanocomposite coating 122 further includes a lubricating agent to reduce friction on the nanocomposite coating 122. The lubricating agent may include at least one of calcium stearate or silicone oil. The nanocomposite coating 122 may include from 0.01 to 8 wt. %, from 0.01 to 3.75 wt. %, from 0.01 to 1.75 wt. %, from 0.25 to 8 wt. %, from 0.25 to 3.75 wt. %, from 0.25 to 1.75 wt. %, from 0.75 to 8 wt. %, from 0.75 to 3.75 wt. %, or from 0.75 to 1.75 wt. % lubricating agent as calculated by a weight of the resin.

The nanocomposite coating 122 may further include an accelerating agent. The accelerating agent may include at least one of hydrochloric acid, zinc acetate, sodium hydroxide, boron trifluoride etherate, acetic acid, or carboxylic acid. The accelerating agent may include at least one of a Lewis acid, zinc or manganese ions, bases, or salts. The nanocomposite coating 122 may include from 1 to 70 wt. %, from 1 to 45 wt. %, from 1 to 20 wt. %, from 5 to 70 wt. %, from 5 to 45 wt. %, from 5 to 12 wt. %, from 12 to 70 wt. %, from 12 to 45 wt. %, from 12 to 20 wt. % accelerating agent as calculated by a weight of the proppant particles.

Referring again to FIG. 1, in one or more embodiments, the proppant particle 110 may be coated with a nanocomposite coating 122 during a coating step 130 to produce, form, or result in a nanocomposite coated proppant 120. In some embodiments, the nanocomposite coating 122 may be a surface layer on or bound to the proppant particle 110. Such a surface layer may cover at least a portion of the surface of the proppant particle 110. For example, the nanocomposite coating 122 may coat the proppant particle 110 with the nanocomposite coating 122. The nanocomposite coating 122 may coat the entire surface of the proppant particle 110 (as shown) or, alternatively, may only partially coat the proppant particle 110 (not shown), leaving at least a portion of surface of the proppant particle 110 uncoated or otherwise exposed. The nanocomposite coating 122 may include a plurality of carbon nanotubes 140. The carbon nanotubes 140 may be evenly dispersed within the resin or at least may have reduced clumping relative to carbon nanotubes 140 formed into a nanocomposite coating 122 according to traditional methods. For example, the dispersed carbon nanotubes 140 may not be substantially agglomerated.

The method may further include coating the proppant particles 110 with a coupling agent or a crosslinker. In some embodiments, the method further includes employing a lubricating agent or an accelerating agent. In other embodiments, the method includes coating proppant particles 110 with a top coating. The top coating may be an overlying layer that may be added for additional properties or features. As a non-limiting example, additional coatings may be used in conjunction with, or may include, a breaker. As used throughout this disclosure, a "breaker" refers to a compound that may break or degrade the coating after a fracturing operation to prevent subsurface formation damage. In some embodiments, the breaker may be an oxidizer or enzyme breaker. The breaker may be any suitable material capable of degrading a coating material.

The method may include calcining the proppant particle 110 up to 100° F., 200° F., 300° F., 350° F., 370° F., 400° F., 450° F., or 500° F. prior to the coating step. The calcining may include application of heat by any suitable process such as by forced hot air heating, convection, friction, conduction, combustion, exothermic reactions, microwave heating, or infrared radiation, for example.

In some embodiments, the method may further include roughening the proppant particles before the coating step 130. The proppant particles may be chemically or physically roughened, as previously described.

In some embodiments, the coating step 130 may include contacting the proppant particle 110 with uncured resin in a fluidized bed process. In some embodiments, the coating step may include a stationary, bubbling, circulation, or vibratory fluidized bed process. In some embodiments, the coating step 130 may include spraying or saturating the proppant particles 110 with the uncured resin. The coating step 130 may include, in some embodiments, tumbling or agitating the coated proppants to prevent agglomeration or clumping. The coating step 130 may include adding another compound to the uncured resin, such as a solvent, an initiator, an adhesion promoter, or an additive, to form the nanocomposite coating 122. In some embodiments, the coating step 130 may be conducted with an emulsion coating technique. In some embodiments, the adhesion promoter may include a silane (for example, amino silane) or a silane-containing monomer. In some embodiments, an adhesion promoter may not be necessary to coat the proppant particles.

The method for producing the nanocomposite coated proppant 120 may include curing the nanocomposite coating. Curing the nanocomposite coating may include one or more of introducing a crosslinking agent to the nanocomposite coating, adjusting the temperature of the nanocomposite coating, adjusting the pH of the nanocomposite coating, exposing the nanocomposite coating to a solution and adjusting a pH of the solution, dehydrating the nanocomposite coating, waiting a period of time after mixing the nanocomposite coating, applying a pressure to the nanocomposite coating, or a combination thereof. By way of example, but not by limitation, the crosslinking agent may include hexamethylenetetramine, epichlorohydrin, amines, cyclic anydries, polyfunctional primary amines, mercaptans, polyphenols, bisphenol A, or novolacs. By way of example, but not by limitation, the curing temperature may be from 50° C. to 100° C., from 100° C. to 200° C., from 200° C. to 300° C., from 300° C. to 400° C., from 400° C. to 500° C., from 500° C. to 750° C., from 750° C. to 1000° C., from 1000° C. to 1250° C., from 1250° C. to 1500° C., from 1500° C. to 2000° C., from 2000° C. to 2500° C., from 2500° C. to 3000° C., or even greater than 3000° C., or any combination thereof. By way of example, but not by limitation, the pH of the nanocomposite coating may be adjusted from between 1 to 1.2, 1.2 to 1.4, 1.4 to 1.6, 1.6 to 1.8, 1.8 to 2.0, 2.0 to 2.2, 2.2 to 2.4, 2.4 to 2.6, 2.6 to 2.8, 2.8 to 3.0, 3.0 to 3.2, 3.2 to 3.4, 3.4 to 3.6, 3.6 to 3.8, 3.8 to 4.0, 4.0 to 4.2, 4.2 to 4.4, 4.4 to 4.6, 4.6 to 4.8, 4.8 to 5.0, 5.0 to 5.2, 5.2 to 5.4, 5.4 to 5.6, 5.6 to 5.8, 5.8 to 6.0, 6.0 to 6.2, 6.2 to 6.4, 6.4 to 6.6, 6.6 to 6.8, 6.8 to 7.0, 7.0 to 7.2, 7.2 to 7.4, 7.4 to 7.6, 7.6 to 7.8, 7.8 to 8.0, 8.0 to 8.2, 8.2 to 8.4, 8.4 to 8.6, 8.6 to 8.8, 8.8 to 9.0, 9.0 to 9.2, 9.4 to 9.6, 9.6 to 9.8, 9.8 to 10.0, 10.0 to 10.2, 10.2 to 10.4, 10.4 to 10.6, 10.6 to 10.8, 10.8 to 11.0, 11.0 to 11.2, 11.2 to 11.4, 11.4 to 11.6, 11.6 to 11.8, 11.8 to 12.0, 12.0 to 12.2, 12.2 to 12.4, 12.4 to 12.6, 12.6 to 12.8, 12.8 to 13.0, or any combination thereof. By way of example, but not by limitation, the pH of the solution to which the nanocomposite coating is exposed may be adjusted from between 1 to 1.2, 1.2 to 1.4, 1.4 to 1.6, 1.6 to 1.8, 1.8 to 2.0, 2.0 to 2.2, 2.2 to 2.4, 2.4 to 2.6, 2.6 to 2.8, 2.8 to 3.0, 3.0 to 3.2, 3.2 to 3.4, 3.4 to 3.6, 3.6 to 3.8, 3.8 to 4.0, 4.0 to 4.2, 4.2 to 4.4, 4.4 to 4.6, 4.6 to 4.8, 4.8 to 5.0, 5.0 to 5.2, 5.2 to 5.4, 5.4 to 5.6, 5.6 to 5.8, 5.8 to 6.0, 6.0 to 6.2, 6.2 to 6.4, 6.4 to 6.6, 6.6 to 6.8, 6.8 to 7.0, 7.0 to 7.2, 7.2 to 7.4, 7.4 to 7.6, 7.6 to 7.8, 7.8 to 8.0, 8.0 to 8.2, 8.2 to 8.4, 8.4 to 8.6, 8.6 to 8.8, 8.8 to 9.0, 9.0 to 9.2, 9.4 to 9.6, 9.6 to 9.8, 9.8 to 10.0, 10.0 to 10.2, 10.2 to 10.4, 10.4 to 10.6, 10.6 to 10.8, 10.8 to 11.0, 11.0 to 11.2, 11.2 to 11.4, 11.4 to 11.6, 11.6 to 11.8, 11.8 to 12.0, 12.0 to 12.2, 12.2 to 12.4, 12.4 to 12.6, 12.6 to 12.8, 12.8 to 13.0, or any combination thereof. By way of example, but not by limitation, dehydrating the nanocomposite coating may include decreasing the water content of the resin to less than 50%, 45%, 40%, 35%, 30%, 25%, 20%, 15%, 10%, 5%, 4%, 3%, 2%, 1%, or even less than 1%. By way of example, but not by limitation, waiting a period of time after mixing the nanocomposite coating may include waiting greater than 30 seconds (sec.), 1 min., 2 min., 3 min., 4 min., 5 min., 10 min., 20 min., min., 40 min., 60 min., 80 min., 100 min., 120 min., 140 min., 160 min., 180 min., or even greater than 180 min. By way of example, but not by limitation, applying a pressure to the nanocomposite coating may include applying a pressure of greater than 1 bar, 2 bar, 3 bar, 4, bar, 5 bar, 10 bar, 20 bar, 40 bar, 60 bar, 80 bar, 100 bar, 200 bar, 300 bar, 400 bar, 500 bar, or even greater than 500 bar.

For the purposes of describing and defining the present disclosure, it is noted that reference in this application to a characteristic of the subject matter of the present disclosure being a "function of" a parameter, variable, or other characteristic is not intended to denote that the characteristic is exclusively a function of the listed parameter, variable, or characteristic. Rather, reference in this application to a characteristic that is a "function" of a listed parameter, variable, is intended to be open ended such that the characteristic may be a function of a single parameter, variable, or a plurality of parameters or variables.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

The presently described subject matter may include one or more aspects, which should not be regarded as limiting on the teachings of the present disclosure. A first aspect may include a method of making nanocomposite coated proppants with a nanocomposite coating, the method comprising: adding a quantity of precursor nanoparticles comprising carbon nanotubes supported by metal oxide catalyst nanoparticles to an uncured resin, in which the metal oxide catalyst nanoparticles and the uncured resin are selected such that the metal oxide catalyst nanoparticles are dissolvable in the uncured resin, and the metal oxide catalyst nanoparticles are capable of dissolving in the uncured resin such that an amount of carbon nanotubes are dispersed within the uncured resin to form a nanocomposite coating; and coating proppant particles with the nanocomposite coating to make nanocomposite coated proppants.

A second aspect may include a nanocomposite coated proppant comprising: a proppant particle, and a nanocomposite coating that coats a surface of the proppant particle, in which the nanocomposite coating comprises a cured resin and a quantity of dispersed carbon nanotubes.

Another aspect includes any of the previous aspects, in which individual nanoparticles of the metal oxide catalyst nanoparticles comprise a metal oxide and a transition metal.

Another aspect includes any of the previous aspects, in which the transition metal comprises Fe, Co, or Ni.

Another aspect includes any of the previous aspects, in which the metal oxide comprises MgO or CaO.

Another aspect includes any of the previous aspects, in which the transition metal is disposed on the metal oxide.

Another aspect includes any of the previous aspects, in which the carbon nanotubes are adsorbed onto the metal oxide catalyst nanoparticles.

Another aspect includes any of the previous aspects, in which individual nanoparticles of the metal oxide catalyst nanoparticles comprise 10 wt. % or less transition metal as calculated by a weight of the metal oxide.

Another aspect includes any of the previous aspects, further comprising functionalizing a surface of the carbon nanotubes with at least one of carboxylates, ammonium derivatives, sulfonated monomers, oligomers, or polymers, after adding the quantity of precursor nanoparticles to the uncured resin.

Another aspect includes any of the previous aspects, further comprising synthesizing carbon nanotubes via chemical vapor deposition on metal oxide catalyst nanoparticles to form the quantity of precursor nanoparticles.

Another aspect includes any of the previous aspects, in which synthesizing carbon nanotubes via chemical vapor deposition on metal oxide catalyst nanoparticles comprises diffusing carbon atoms through the carbon nanotubes.

Another aspect includes any of the previous aspects, in which synthesizing carbon nanotubes via chemical vapor deposition on metal oxide catalyst nanoparticles comprises diffusing carbon atoms along a surface of individual nanoparticles of the metal oxide catalyst nanoparticles.

Another aspect includes any of the previous aspects, in which the carbon nanotubes comprise at least one of single-walled nanotubes, double-walled nanotubes, multi-walled carbon nanotubes, or narrow-walled nanotubes.

Another aspect includes any of the previous aspects, in which the carbon nanotubes comprise a diameter of from 1 nm to 200 nm.

Another aspect includes any of the previous aspects, in which the carbon nanotubes comprise a length of from 20 to 500 μm.

Another aspect includes any of the previous aspects, in which the carbon nanotubes comprise a specific surface area of from 100 $m^2/g$ to 12,000 $m^2/g$.

Another aspect includes any of the previous aspects, in which the weight ratio of dispersed carbon nanotubes to resin is from 1:1000 to 1:10.

Another aspect includes any of the previous aspects, in which the method further comprises one or more of raising a mixture pH, lessening the mixture pH, ultrasonification, heating, stirring, shaking, agitation, microwave heating, magnetic mixing, or mixing in a static mixer.

Another aspect includes any of the previous aspects, further comprising exposing the supported carbon nanotubes supported by metal oxide catalyst nanoparticles silicon vapor to create silicon carbide precursor nanoparticles.

Another aspect includes any of the previous aspects, in which the resin comprises at least one of a phenol, a phenolic polyurethane, polyurethane, furan, epoxy, urethane, novolac or phenol-formaldehyde.

Another aspect includes any of the previous aspects, further comprising curing the nanocomposite coating.

Another aspect includes any of the previous aspects, further comprising mixing a surfactant with the uncured resin.

Another aspect includes any of the previous aspects, in which the proppant particles are particles of a material comprising at least one of oxides, silicates, sand, ceramic, resin, plastic, mineral, glass, graded sand, treated sand, resin-coated sand, bauxite, sintered bauxite, glass particles, glass beads, and combinations of any of these.

Another aspect includes any of the previous aspects, in which the proppant particles comprise a diameter from 106 micrometers (μm) to 2.36 millimeters (mm)).

Another aspect includes any of the previous aspects, in which the nanocomposite coating has a persistent dispersion homogeneity.

For the purposes of describing and defining the present disclosure it is noted that the terms "substantially" and "approximately" are utilized in this application to represent the inherent degree of uncertainty that may be attributed to any quantitative comparison, value, measurement, or other representation. The terms "substantially" and "approximately" are also utilized in this application to represent the degree by which a quantitative representation may vary from a stated reference without resulting in a change in the basic function of the subject matter at issue.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

The invention claimed is:

1. A method of making nanocomposite coated proppants with a nanocomposite coating, the method comprising:
    adding a quantity of precursor nanoparticles comprising carbon nanotubes supported by metal oxide catalyst nanoparticles to an uncured resin, in which
        the metal oxide catalyst nanoparticles and the uncured resin are selected such that the metal oxide catalyst nanoparticles are dissolvable in the uncured resin, and
        the metal oxide catalyst nanoparticles are capable of dissolving in the uncured resin such that an amount of carbon nanotubes are dispersed within the uncured resin to form a nanocomposite coating; and
    coating proppant particles with the nanocomposite coating to make nanocomposite coated proppants.

2. The method of claim 1, in which individual nanoparticles of the metal oxide catalyst nanoparticles comprise a metal oxide and a transition metal.

3. The method of claim 2, in which the transition metal comprises Fe, Co, or Ni.

4. The method of claim 2, in which the metal oxide comprises MgO or CaO.

5. The method of claim 2, in which the transition metal is disposed on the metal oxide.

6. The method of claim 2, in which individual nanoparticles of the metal oxide catalyst nanoparticles comprise 10 wt. % or less transition metal as calculated by a weight of the metal oxide.

7. The method of claim 1, in which the carbon nanotubes are adsorbed onto the metal oxide catalyst nanoparticles.

8. The method of claim 1, further comprising functionalizing a surface of the carbon nanotubes with at least one of carboxylates, ammonium derivatives, sulfonated monomers, oligomers, or polymers, after adding the quantity of precursor nanoparticles to the uncured resin.

9. The method of claim 1, further comprising synthesizing carbon nanotubes via chemical vapor deposition on metal oxide catalyst nanoparticles to form the quantity of precursor nanoparticles.

10. The method of claim 9, in which synthesizing carbon nanotubes via chemical vapor deposition on metal oxide catalyst nanoparticles comprises diffusing carbon atoms through the carbon nanotubes.

11. The method of claim 9, in which synthesizing carbon nanotubes via chemical vapor deposition on metal oxide catalyst nanoparticles comprises diffusing carbon atoms along a surface of individual nanoparticles of the metal oxide catalyst nanoparticles.

12. The method of claim 9, further comprising exposing the supported carbon nanotubes supported by metal oxide catalyst nanoparticles to silicon vapor to create silicon carbide precursor nanoparticles.

13. The method of claim 1, in which the carbon nanotubes comprise at least one of single-walled nanotubes, double-walled nanotubes, or multi-walled carbon nanotubes.

14. The method of claim 1, in which the carbon nanotubes comprise a diameter of from 1 nm to 200 nm.

15. The method of claim 1, in which:
    the carbon nanotubes comprise a length of from 20 to 500 μm; and
    in which the carbon nanotubes comprise a specific surface area of from 100 $m^2/g$ to 12,000 $m^2/g$.

16. The method of claim 1, in which the weight ratio of dispersed carbon nanotubes to resin is from 1:1000 to 1:10.

17. The method of claim 1, in which:
    the resin comprises at least one of a phenol, a phenolic polyurethane, polyurethane, furan, epoxy, urethane, novolac or phenol-formaldehyde;
    the proppant particles are particles of a material comprising at least one of oxides, silicates, sand, ceramic, resin, plastic, mineral, glass, graded sand, treated sand, resin-coated sand, bauxite, sintered bauxite, glass particles, glass beads, and combinations of any of these; and
    the proppant particles comprise a diameter from 106 micrometers (μm) to 2.36 millimeters (mm)).

18. The method of claim 1, in which the method further comprises one or more of:
    raising a pH of the uncured resin,
    lessening the pH of the uncured resin,
    ultrasonification of the uncured resin,
    heating of the uncured resin,
    stirring the uncured resin,
    shaking the uncured resin,
    agitating the uncured resin,
    microwave heating the uncured resin,
    magnetic mixing the uncured resin, or
    mixing the uncured resin in a static mixer.

19. The method of claim 1 further comprising curing the nanocomposite coating.

20. The method of claim 1, further comprising mixing a surfactant with the uncured resin.

\* \* \* \* \*